United States Patent [19]
Fisk et al.

[11] Patent Number: 5,380,953
[45] Date of Patent: Jan. 10, 1995

[54] JOINED COPPER ALLOYS

[75] Inventors: Brian Fisk, Franklin Lakes, N.J.;
Joseph Winter, New Haven, Conn.

[73] Assignee: Fisk Alloy Wire, Inc., Hawthorne, N.J.

[21] Appl. No.: 147,479

[22] Filed: Nov. 5, 1993

Related U.S. Application Data

[63] Continuation-in-part of Ser. No. 48,816, Apr. 16, 1993.

[51] Int. Cl.⁶ .................................... H01R 4/00
[52] U.S. Cl. .................................... 174/94 R; 29/870; 174/84 R
[58] Field of Search .............. 219/57, 58, 56.1, 56.21, 219/100, 101, 104, 105, 107, 117.1, 118; 228/156, 158, 193, 234, 243, 263.18; 174/94 R, 84 R; 29/869, 870

[56] References Cited

U.S. PATENT DOCUMENTS

| 4,269,344 | 5/1981 | Vervleit | 228/125 |
| 5,310,985 | 5/1994 | Fisk et al. | 219/117.1 |

FOREIGN PATENT DOCUMENTS

| 1500678 | 9/1969 | Germany | 219/118 |
| 37-3362 | 2/1962 | Japan | 219/104 |
| 4-251679 | 9/1992 | Japan | 219/118 |

Primary Examiner—Morris H. Nimmo
Attorney, Agent, or Firm—Bachman & LaPointe

[57] ABSTRACT

End faces of copper alloys to be used for electrical conductors are placed in contacting relationship under a compressive force below the yield strength of the copper alloy conductor in the room temperature condition. The contacting end faces are heated under continuous compression at a temperature of at least 300° C. but below the solvus temperature of the copper alloy in at least one heating cycle.

10 Claims, 1 Drawing Sheet

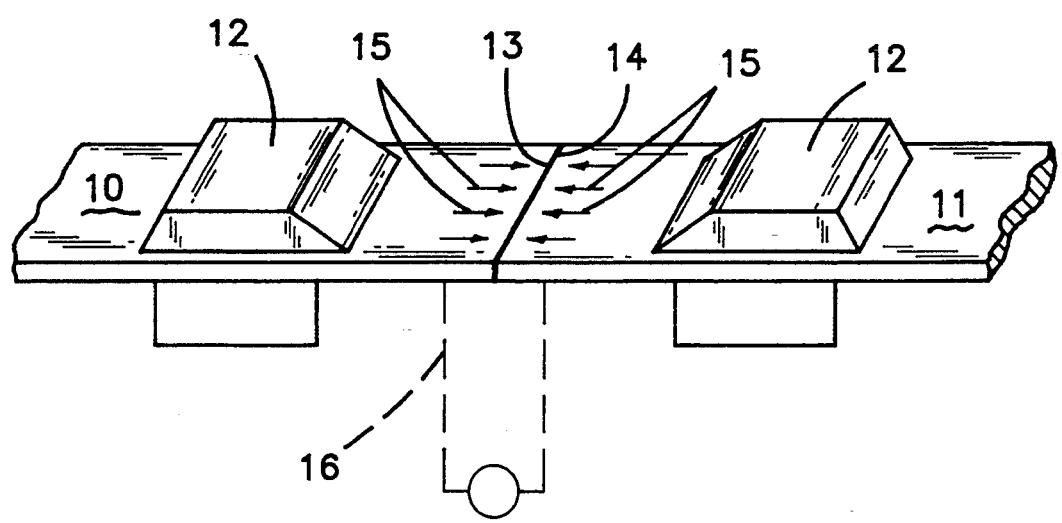

5,380,953

JOINED COPPER ALLOYS

CROSS-REFERENCE TO RELATED APPLICATION

This application is a continuation-in-part of copending U.S. patent application Ser. No. 08/048,816, filed Apr. 16, 1993.

BACKGROUND OF THE INVENTION

The present invention provides joined dilute copper based alloys to be used for electrical conductors, such as wire and cable, to produce long coils of wire and shaped wire products. The joined material achieves high strength welds close to parent properties and characteristics without the need for heat or mechanical treatment to restore properties to the weld and its adjacent zone typical of current welding practices.

Electrical connector and conductor applications which are not satisfied by commercially pure copper are increasingly being replaced by dilute alloys of copper. These alloys have less than 20% alloying content (80% copper based) and usually have less than 5.0% alloying content. The alloying addition is designed to strengthen the structure by precipitation and/or particle or work hardening, thereby only minimally impacting conductivity.

The process involved in making or maintaining long coils of these alloys requires coil butt welding. Due to the nature of the drawn and shaped wire forming processes or cabling procedures and to assure economics, these end butt welds should desirably be done so as not to degrade the metal properties in the weld region. Naturally, also, the weld structure should be as close to the parent structure in mechanical and electrical properties as possible. Specifically, a weld zone of heat affected metal resulting from a fusion bonding process would adversely affect mechanical properties and especially electrical conductivity. Cold pressure welding, which is significantly more difficult to do in large or non-round configurations, also yields significant increases in strain hardening with concomitant loss in ductility in the weld zone.

One can overcome the above deficiencies by subsequent heat treating procedures or cold work on the entire coil, but this is expensive and time consuming and can create other problems.

Accordingly, it is a principal object of the present invention to provide joined copper alloy electrical conductors in strip, rod or wire form.

It is a particular object of the present invention to provide a joined copper alloy conductor as aforesaid having good strength and conductivity properties.

It is a still further object of the present invention to provide coils of joined copper alloy conductor.

It is also an object of the present invention to provide a joined copper alloy as aforesaid which is convenient and expeditious to obtain.

Further objects anti advantages of the present invention will appear hereinbelow.

SUMMARY OF THE INVENTION

In accordance with the present invention, the foregoing objects and advantages are readily obtained.

The present invention resides in joined dilute copper based alloys to be used for electrical connectors or electrical conductors, such as wire and cable. The joined copper alloys of the present invention contain less than 20% alloying additions and at least 0.01% each of the alloying elements tin, iron, zirconium, cadmium, beryllium, silver and magnesium, and have substantially planar end faces thereof which are in contacting relationship and which are joined together in a welding zone, wherein the end faces are joined under a compressive force below the yield strength of the copper alloy in the room temperature condition, said joined copper alloy having good strength and conductivity properties, with the alloying elements substantially out of solution and with the mechanical properties in the welding zone being substantially the same as the parent material. In accordance with the present invention the end faces of copper alloys to be joined, generally substantially planar end faces, are placed ill contacting relationship under a continuous compressive force which is not above the yield strength of the copper alloy in the room temperature condition. The copper alloy conductor to be joined contains less than 20% and generally less than 5.0% alloying additions. The contacting end faces are heated at a temperature of at least 300° C. but below the solvus temperature of the copper alloy in at least one heating cycle, which results in upsetting of the contacting faces. The term "upsetting" contemplates mashing or pressing together the contacting faces with the extrusion of metal flash. Generally 1-3 heating, upset cycles are used, with each cycle being preferably less than 30 seconds duration. The contacting end faces form a joined copper alloy conductor with improved weld integrity and with good strength and conductivity properties.

Since flash will generally form at the joined end faces, the present invention includes the joined copper alloys with the flash removed at the joined end faces.

Preferably, a temperature of about 300° to 850° C. is employed and preferably the heating at the end faces is provided by passing an electrical current across the contacting end faces to provide resistance heating at the interface between the contacting end faces.

The present invention also includes the joined copper alloy electrical conductor and strip, wherein the strip has a width which is no greater than 20 times thickness. The present invention also includes joined alloys in the form of wire or shaped wire.

Further features of the present invention will appear hereinbelow.

The present invention will be more readily understandable from the attached exemplificative drawing which shows:

The preparation of the joined copper alloy of the present invention.

BRIEF DESCRIPTION OF THE DRAWINGS

The present invention will be more readily understood from a consideration of the appended drawing in which:

The procedure for forming the joined copper alloys of the present invention is shown.

DETAILED DESCRIPTION OF PREFERRED EMBODIMENTS

The present invention provides joined copper alloy electrical conductors to enable the production of long coils of copper alloy electrical conductor or sections thereof with good strength and electrical conductivity properties at the joined interface. Advantageously, the present invention provides continuous lengths of copper alloy conductor. The term "electrical conductor" is intended to encompass electrical connectors or electrical conductors such as wire, cable, strip or shaped wire products derived from these forms. For example, wire and cable, fabricated conductor cables, pins fabricated from shaped wire, or wire whose objective is power or signal transmission.

The copper alloys in accordance with the present invention have less than 20% alloying content and generally less than 5.0%. The alloying addition or additions are generally designed to strengthen the structure by precipitation or work or particle hardening, thereby only minimally impacting electrical conductivity. Typical alloying additions include small amounts, generally at least 0.01% each, of at least one of tin, iron, zirconium, phosphorus, cadmium, beryllium, silver, and/or magnesium. These will normally go into solution at elevated temperature during fabrication and then are precipitated out at low or moderate temperature to achieve electrical conductivity objectives. Naturally, the usual impurities may be tolerated.

In accordance with the present invention, the joined copper alloys of the present invention are prepared by placing end faces of the aforesaid electrical conductors in contacting relationship under a continuous compressive force generally of at least 500 psi and generally between 10,000 and 40,000 psi, but below the room temperature condition yield strength of the copper alloy being joined. The continuous compressive force is preferably at approximately 50% of the room temperature yield strength of the materials. In accordance with the present invention one must have the application of continuous force to allow metal movement at the contacting zone. The butt ends of the alloy conductors to be joined are rigidly clamped with the butt faces in contact and with the butt faces simultaneously subjected to a compressive force as above, such as pneumatically applying live force to the butt races. Naturally, the contacting faces may have any desired configuration which preferably should desirably be planar and closely match, for example, rectangular or round.

The contacting faces, under continuous compression, are heated at a temperature of at least 300° C. and generally between 400°-800° C., but below the solvus temperature of the particular copper alloy conductor being joined. Preferably, the heating at the end faces is provided by passing an electrical current across the contacting end faces to provide resistance heating at the interface between the contacting end faces, although any other localized heating method is suitable, as induction or torch heating. As soon as the heated end faces reach their flow stress under the applied dynamic or live compressive force they will join together extruding flash at the interface. Different alloys naturally have different flow stress/temperature relationships. Thus, specific processing conditions for preparing the joined copper alloys will vary within the scope of the present invention to accommodate this and to insure welding below the solvus temperature. This may take only a fraction of a second and generally not longer than about 15-30 seconds.

The foregoing is considered one heating cycle. Generally, as many as three heating and compressing cycles may be used, with preferred practice using two heating cycles, with reclamping for each cycle and applying the live compressive force during each cycle to further upset the engaged interface.

Flash may be removed by any convenient method, as by shearing, grinding or the like.

In accordance with the foregoing, an improved, joined copper alloy electrical conductor is obtained enabling one to obtain long coils or continuous lengths of the joined material. The resultant product is characterized by good strength and electrical conductivity properties at the joined interface. In addition, since the work piece never sees temperatures above the solvus temperature of the alloy, precipitates or alloying particulate will substantially not be dissolved. Thus, the joined alloys of the present invention are characterized by the presence of precipitates which yields improved conductivity. Further, the thermal excursion which is inherent in the foregoing procedure is lower than the recrystallization temperature, and of very short duration. Therefore, the cold work inherent to the parent material will be substantially retained. In addition, multiple cycles as aforesaid will assure that no oxidized intersurface material is available to adversely degrade the weld.

The joined copper alloys of the present invention may desirably be a section of a coil of copper alloy conductor which has uniform resulting properties in sections cut therefrom, or a continuous coil of copper alloy conductor, The alloys of the present invention are characterized by the absence of substantial thermal treatment in the weld zone.

The present invention provides equilibration of mechanical and electrical properties in the weld zone with the parent metal without need for an equilibrating thermal treatment. Material fusion welded at or near the melting temperature of the alloy will cause solutionization of the alloying elements with concomitant loss of conductivity in the weld region. Similarly when the parent metal has cold work, the weld region will be annealed with course grain size and lower mechanical strength, which will persist through subsequent processing unless thermally equilibrated. Material jointed by the "cold-weld" process at or near room temperature are characterized by severe cold work in the weld zone which inhibits additional drawing or shaping operations required to achieve final shape unless the material is thermally equilibrated.

Further features and advantages of the present invention will appear from the following illustrative examples.

EXAMPLE 1

In this example, end faces of rectangular cross section, copper alloy strip having dimensions of about 0.5 inch by 0.125 inch, were rigidly clamped together with the butt faces in contact. The copper alloy contained about 98.8% copper, plus alloying additions of 0.8% iron, 0.2% phosphorus and 0.1% magnesium, plus impurities. The rigidly clamped butt faces were simultaneously with clamping subjected to a dynamic compressive force of about 1500 pounds of live force applied pneumatically. Electrical current was then passed across the butt faces to provide resistance heating at the interface to be joined. As soon as the heated strip reached its elevated temperature flow stress under compressive force, it joined together extruding flash, and two cycles performed.

This is shown in the drawing wherein copper alloy strip 10, 11 are rigidly clamped together by clamping means 12 with the butt faces 13 and 14 in contact. The clamped faces are subjected to compressive force along arrows 15 and electrical current passe across the butt faces via circuit 16.

Several different tests were performed as shown in Table I, below. The temperature at the interface depends on the power settings. Test III represents the parent material.

TABLE I

| TEST | UPSET FORCE (LBS.) | POWER AMPS AT 460 V | PEAK TEMP | % IACS CONDUCTIVITY | TENSILE STRENGTH PSI |
| --- | --- | --- | --- | --- | --- |
| IA | 1500 | 70 | 538° C. | 72.1 | 39250 |
| IB | 1500 | 70 | 593° C. | 75.9 | 37441 |
| IIA | 1350 | >300 | >MP | 61.6 | 33868 |
| IIB | 1350 | >300 | >MP | 63.9 | 32015 |
| III | UNWELDED PARENT MATERIAL | | | 78.9 | 41676 |

This shows that the fusion welded samples as characterized by samples IIA and IIB, when compared with the parent sample III, reveal significant decrease in conductivity attributable to solutionizing the dilute alloying additions with concomittment sharp decrease in UTS due to the elevated temperature exposure.

Samples IA and IB were pressure welded at temperatures well below its solvus and show only slight decrease in conductivity and tensile strength compared to the cold worked parent specimen III.

Good welds were obtained by all samples.

Power settings of >300 resulted in interfacial melting at the end faces. Power settings of 70 amps were dull red at the interface.

EXAMPLE 2

A dilute copper alloy containing about 99.8% copper, 0.10% nominal zirconium plus usual impurities was processed in a manner after Example 1. The solvus temperature for this alloy is about 900° C. Properties for this alloy as a function of thermal exposure remain relatively consistent until about 400° C., above which the properties tend to drop gradually. The results are shown in Table II.

TABLE II

| TEST | UPSET FORCE (LBS.) | POWER AMPS AT 460 VOLT | PEAK TEMP | % IACS CONDUCTIVITY | TENSILE STRENGTH PSI |
| --- | --- | --- | --- | --- | --- |
| IVA | 1500 | 62 | 630° C. | 80.6 | 42985 |
| IVB | 1500 | 62 | 627° C. | 82.44 | 42956 |
| VA | 1350 | 300 | >MP | 73.55 | 30279 |
| VB | 1350 | 300 | >MP | 75.72 | 23868 |
| VI | UNWELDED PARENT METAL | | | 90.86 | 58191 |

This shows that the fusion welded samples as characterized by samples VA and VB, when compared with the parent sample VI, reveal significant decrease in conductivity attributable to solutionizing the zirconium alloying addition with concomittment sharp decrease in UTS due to the elevated temperature exposure.

Samples IVA and IVB were pressure welded at temperatures well below its solvus and show only slight decrease in conductivity and tensile strength compared to the cold worked parent specimen VI.

Good welds were obtained by all samples.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Joined copper alloys to be used for electrical conductors, which comprises: copper alloys containing less than about 20% alloying additions and at least 0.01% each of at least one of the alloying elements tin, iron, zirconium, cadmium, beryllium, silver and magnesium, and having substantially planar end faces thereof in contacting relationship and which are joined together in a welding zone under a continuous compressive force below the yield strength of the copper alloy in the room temperature condition at a temperature of at least 300° C. but below the solvus temperature of the copper alloy, said joined copper alloy having good strength and conductivity properties, with the alloying elements substantially out of solution and with the mechanical properties in the welding zone being substantially the same the parent material.

2. Joined alloys according to claim 1 wherein the copper alloy is a copper alloy conductor.

3. Joined alloys according to claim 2 wherein the alloys contain less than 5% alloying additions.

4. Joined alloys according to claim 2 wherein the joined copper alloy conductor is in the form of a coil of copper alloy conductor.

5. Joined alloys according to claim 1 in the form of strip having a width no greater than twenty times thickness.

6. Joined alloys according to claim 1 in the form of wire or shaped wire.

7. Joined alloys according to claim 1 characterized by the presence of alloying elements in undissolved precipitates which yields improved conductivity.

8. Joined copper alloys according to claim 2 wherein the joined copper alloy conductor is a section of a coil of copper alloy conductor which has uniform resulting properties in sections cut therefrom.

9. Joined copper alloys according to claim 7 wherein the joined copper alloy conductor is a continuous coil of copper alloy conductor.

10. Joined copper alloys according to claim 1 characterized by the absence of substantial thermal treatment in the weld zone.

* * * * *